United States Patent
Kerfoot, Jr. et al.

(10) Patent No.: US 9,882,248 B2
(45) Date of Patent: Jan. 30, 2018

(54) METHOD AND APPARATUS FOR CONTROLLING ACCESS TO ONE OR MORE MEMORIES IN A RECHARGEABLE BATTERY

(71) Applicant: MOTOROLA SOLUTIONS, INC, Schaumburg, IL (US)

(72) Inventors: Roy L Kerfoot, Jr., Lilburn, GA (US); John E Herrmann, Suwanee, GA (US); Mark C Taraboulos, Dunwoody, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 184 days.

(21) Appl. No.: 14/189,694

(22) Filed: Feb. 25, 2014

(65) Prior Publication Data
US 2015/0244184 A1 Aug. 27, 2015

(51) Int. Cl.
H02J 7/00 (2006.01)
H02J 7/04 (2006.01)
(Continued)

(52) U.S. Cl.
CPC ...... H01M 10/425 (2013.01); *H01M 10/4257* (2013.01); *H01M 10/486* (2013.01); *H01M 2010/4278* (2013.01); *H02J 7/0004* (2013.01); *H02J 7/0047* (2013.01); *H02J 2007/006* (2013.01); *H02J 2007/0096* (2013.01); *H02J 2007/0098* (2013.01)

(58) Field of Classification Search
CPC ................. H02J 7/0004; H02J 2007/0098
See application file for complete search history.

(56) References Cited

U.S. PATENT DOCUMENTS 5,254,928 A * 10/1993 Young ............ H02J 7/0004
307/66
5,534,765 A * 7/1996 Kreisinger ......... H02J 7/0004
320/106

(Continued)

FOREIGN PATENT DOCUMENTS

WO 1990003682 A1 4/1990
WO 199900863 A2 1/1999

(Continued)

OTHER PUBLICATIONS

Corresponding International Application No. PCT/US2015/015107—International Search Report with Written Opinion, date Apr. 17, 2015.

*Primary Examiner* — Samuel Berhanu
*Assistant Examiner* — Tarikh Rankine
(74) *Attorney, Agent, or Firm* — Barbara R. Doutre

(57) ABSTRACT

A method and apparatus for controlling access to one or more memories in a rechargeable battery includes a switching circuit that connects the memory to a device data contact, and disconnects the memory from a charger data contact, when the rechargeable battery is connected only to a device powered by a battery. The switching circuit, however, connects the memory to the charger data contact and disconnects it from the device data contact. In some embodiments a second memory that contains a subset of the data in the first memory is connected to the device data contact when the first memory is connected to the charger data contact.

32 Claims, 4 Drawing Sheets

(51) Int. Cl.
  *H01M 10/42*   (2006.01)
  *H01M 10/48*   (2006.01)

(56) References Cited

U.S. PATENT DOCUMENTS

| | | | | |
|---|---|---|---|---|
| 5,554,921 | A * | 9/1996 | Li | H02J 7/0077 |
| | | | | 320/106 |
| 5,572,110 | A * | 11/1996 | Dunstan | H02J 7/0004 |
| | | | | 320/106 |
| 5,717,307 | A * | 2/1998 | Barkat | H01M 10/44 |
| | | | | 307/125 |
| 5,932,989 | A * | 8/1999 | Thandiwe | H01M 10/4257 |
| | | | | 320/106 |
| 6,005,367 | A | 12/1999 | Rohde | |
| 6,181,103 | B1 * | 1/2001 | Chen | G06F 1/263 |
| | | | | 320/106 |
| 6,194,866 | B1 | 2/2001 | Olsson | |
| 6,212,410 | B1 * | 4/2001 | Ishida | G08B 13/1418 |
| | | | | 455/410 |
| 6,316,916 | B2 | 11/2001 | Bohne | |
| 6,681,278 | B1 | 1/2004 | Jaki | |
| 7,059,769 | B1 * | 6/2006 | Potega | B60L 11/1861 |
| | | | | 338/22 R |
| 7,339,353 | B1 * | 3/2008 | Masias | H02J 1/10 |
| | | | | 320/138 |
| 7,449,863 | B2 | 11/2008 | Tashiro | |
| 8,332,836 | B2 | 12/2012 | Jamerson | |
| 9,182,244 | B2 * | 11/2015 | Luke | B60L 1/003 |
| 2003/0085690 | A1 * | 5/2003 | Shiojima | H02J 7/0086 |
| | | | | 320/164 |
| 2006/0208693 | A1 | 9/2006 | Emori et al. | |
| 2009/0051327 | A1 * | 2/2009 | Bohne | H02J 7/0004 |
| | | | | 320/162 |
| 2011/0045323 | A1 * | 2/2011 | Ooi | H01M 2/1066 |
| | | | | 429/50 |

FOREIGN PATENT DOCUMENTS

| | | |
|---|---|---|
| WO | 2003005557 A1 | 1/2003 |
| WO | 2009085915 A2 | 7/2009 |
| WO | 2012014968 A1 | 2/2012 |

* cited by examiner

METHOD AND APPARATUS FOR CONTROLLING ACCESS TO ONE OR MORE MEMORIES IN A RECHARGEABLE BATTERY

FIELD OF THE DISCLOSURE

The present disclosure relates generally to rechargeable batteries for powering portable and mobile devices, and more particularly to rechargeable batteries which contain one or more memories in which battery data is stored and accessible by both a charger and the device powered by the rechargeable battery.

BACKGROUND

Presently many battery powered devices use operating voltage limits based on the battery chemistry of the rechargeable battery used to power the device. The voltage limits can establish, for example, a shutdown voltage threshold and a power up voltage threshold. A shutdown voltage threshold dictates the lowest battery voltage at which the battery should be operated, and when the battery voltage falls below the shutdown voltage threshold the device shuts down. Once shut down, the device will not power back up until the battery voltage rises above the power up voltage threshold, which typically requires charging the battery.

In conventional devices these limits are hard coded in the software of the device since battery technology has been fairly unchanged. However, more recently, various battery chemistries have been developed that provide benefits in capacity and operating voltage range. As such, it is desirable to not have fixed, or hard coded, voltage thresholds in the device.

It has long been conventional to include a memory device in rechargeable batteries. The memory device can contain data such as voltage thresholds and other battery information. The memory devices typically used in rechargeable batteries are "one wire" type devices that have a single wire for receiving, and transmitting data and commands in a serial fashion. Given that both a charger and the device powered by the rechargeable battery may need to access data in the memory device, there is a need for a method and apparatus that allows multiple masters to have access to battery data stored in a rechargeable battery.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
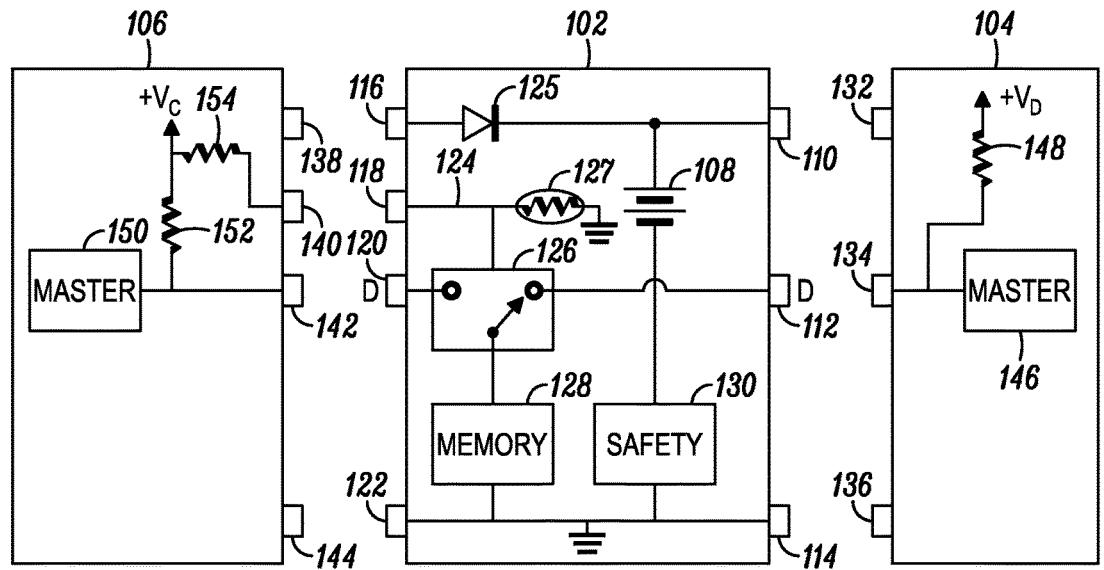
FIG. 1 is a block diagram of a rechargeable battery system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments include a rechargeable battery pack that has a set of charger contacts which interface with a battery charger to facilitate recharging of the rechargeable battery pack, and which include a charger data contact. The rechargeable battery further includes a set of device contacts that interface with a device powered by the rechargeable battery that includes a device data contact. The rechargeable battery further includes a first memory that is writeable, and contains static battery data. A switch circuit in the rechargeable battery alternately connects the first memory to either the charger data contact or the device data contact based on a state of a switch signal provided to the switch circuit.

FIG. 1 is a block diagram of a rechargeable battery system 100, in accordance with some embodiments. The system 100 includes a rechargeable battery 102, also referred to as a rechargeable battery pack, a device 104 that is powered by the rechargeable battery 102, and a charger 106 that recharges the rechargeable battery 102. The rechargeable battery 102 includes one or more battery cells 108 that can be one of a variety of battery chemistries, and have voltage limits based on their chemistry. The rechargeable battery 102 has a set of device contacts, including a positive device contact 110, a device data contact 112, and a negative device contact 114, and a set of charging contacts including a positive charger contact 116, a thermistor contact 118, a charger data contact 120, and a negative charger contact 122. The battery cell or cells 108 are operatively coupled between the positive contacts 110, 116 and the negative contacts 114, 122, and may include safety circuitry 130 connected in series with the battery cells 108. The rechargeable battery 102 also includes a switch circuit 126 that is responsive to a switch signal which can be provided on line 124. In the present drawing the switch signal can be provided through the thermistor contact 118, which is used to also bias a thermistor 127 in the rechargeable battery 102 to sense temperature of the rechargeable battery 102. The switch circuit 126 is used to alternately connect or switch a memory 128 to either the device data contact 112 or the charger data contact 120. In some embodiments the switch circuit 126 can default to connecting the memory 128 to the device data contact 112, and, upon application of the switch signal on line 124, switch to memory 128 connection to the charger data contact 120. In some embodiments the switch circuit 126 can perform switching action in a break-before-make manner, assuring that the charger data contact 120 and the device data contact 112 are never electrically connected together. An advantage to disconnecting the charger data contact 120 from the device data contact 112 is that it avoids galvanic action at the charger data contact 120 when the rechargeable battery 102 is connected to the device 104. The device 104 applies a voltage to the device data contact 112 through its corresponding data contact 134 using, for example, a pull-up resistor 148, to allow a device master 146 to read the memory 128. As used here, the term "master" refers to a circuit or component capable of communicating with the memory using a suitable protocol, and can include, for example, a microprocessor or microcontroller executing suitable instruction code and with suitable logic components. The master can therefore be a standalone component or incorporated into a main microprocessor or controller. The device master 146, once voltage is applied to the memory 128, can communicate with the memory 128 using, for example, a single wire communication protocol. Since the device 104 is portable, such as, for example, a portable two-way radio, it can be exposed to moisture. Thus, by preventing the presence of voltage at the charger data contact 120, galvanic action or galvanic corrosion of the charger data contact 120 is avoided. Likewise, a charging diode 125 or other circuit element that blocks discharge prevents the application of voltage at the positive charger contact 116.

The charger 106, upon being connected to the rechargeable battery 102, applies a voltage to, for example, the thermistor contact 118 of the rechargeable battery 102, through a pull up resistor 154 and a corresponding thermistor contact 140. The voltage provided over the thermistor contact can be used to bias a thermistor 127 in the rechargeable battery 102, and also acts as the switch signal via line 124. In response to the voltage being applied to line 124, the switch circuit 126 switches the memory 128 to the charger data contact 120, allowing the charger master 150 to communicate with the memory 128 using, for example, a single wire communication protocol. As used here, a single wire communication protocol refers to a protocol where the master initiates communication on the single line or wire, and the memory (or other device) responds to the master over the same wire. The masters 146, 150 can be for example, microprocessors or other suitable devices for signaling and receiving data from the memory 128, and can communicate that data to other portions of the device 104 and charger 106, respectively, in some embodiments.

Figure 2:
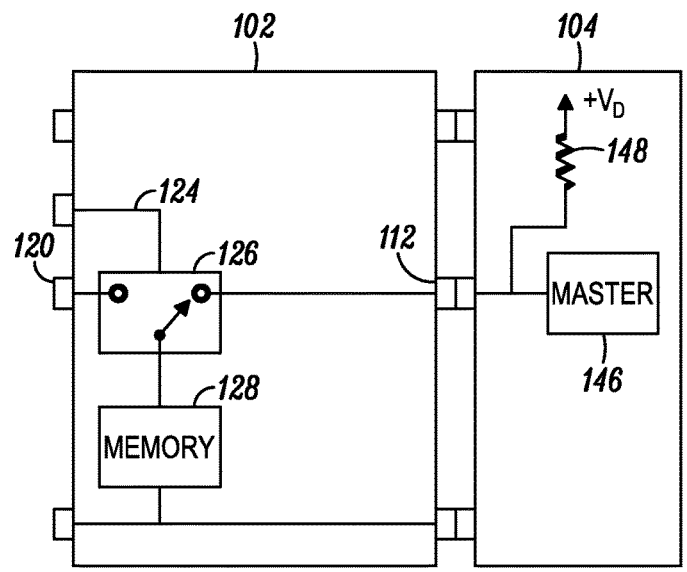
FIG. 2 is a block diagram of a rechargeable battery system where a rechargeable battery is connected to a device only, in accordance with some embodiments.
Figure 3:
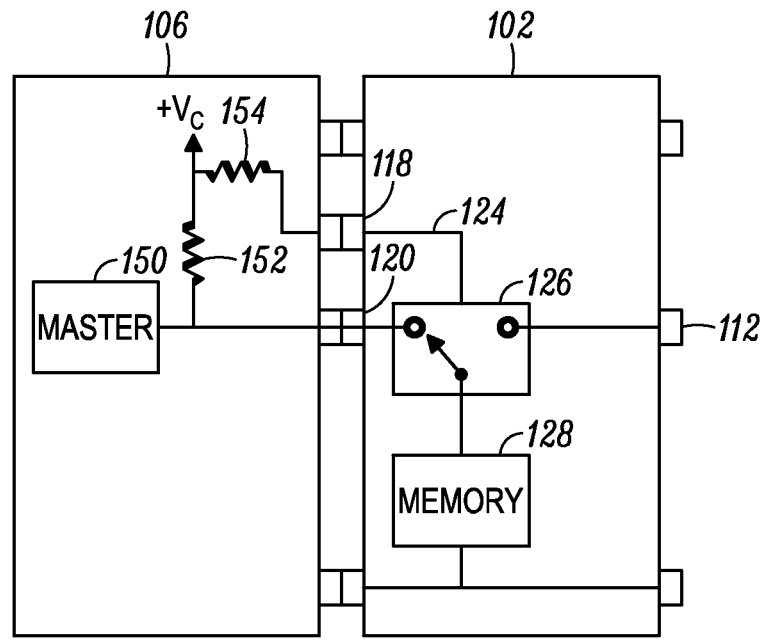
FIG. 3 is a block diagram of a rechargeable battery system where a rechargeable battery is connected to a charger only, in accordance with some embodiments.
Figure 4:
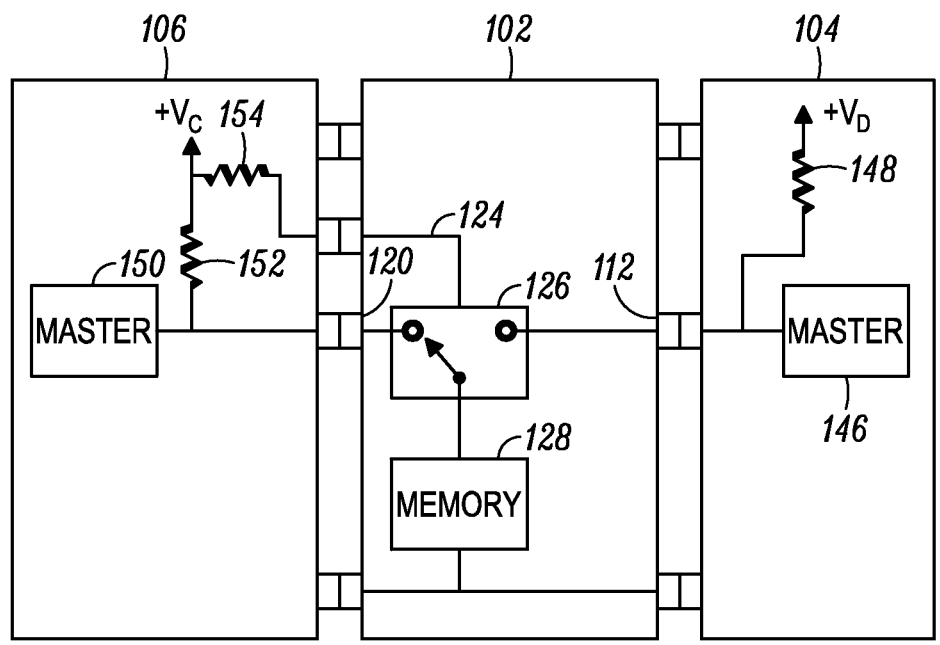
FIG. 4 is a block diagram of a rechargeable battery system where a rechargeable battery is connected to both a charger and a device, in accordance with some embodiments.

FIGS. 2-4 show various combinations of a charger, rechargeable battery, and a device powered by the rechargeable battery.

FIG. 2 is a block diagram of a rechargeable battery system 200 where a rechargeable battery 102 is connected to a device 104 only, in accordance with some embodiments. The state of the switch circuit 126 remains in its default configuration, connecting the memory 128 to the device data contact 112, and disconnecting it from the charger data contact 120 as there is no switch signal on line 124, which prevents any voltage being applied to the memory 128 via the charger data contact 120. Once connected, the device master 146 can read or interact with the memory 128.

FIG. 3 is a block diagram of a rechargeable battery system 300 where a rechargeable battery 102 is connected to a charger 106 only, in accordance with some embodiments. In this configuration, the charger 106 applies a switch signal on line 124 via thermistor contact 118 which causes the switch circuit 126 to switch or connect the memory 128 to the charger data contact 120, allowing the charger master 150 to be able to interact with memory 128 and disconnecting the memory from device data contact 112.

FIG. 4 is a block diagram of a rechargeable battery system 400 where a rechargeable battery 102 is connected to both a charger 106 and a device 104, in accordance with some embodiments. Since the charger 106 supplies the switch signal to the switch circuit 126, the switch circuit 126 connects the memory to the charger data contact 120 and disconnects it from the device data contact 112, as in FIG. 3. While this prevents both masters 146, 150 from attempting to access the memory 128 at the same time, it prevents the device 104 from being able to read the memory 128 when the rechargeable battery 102 is being charged (or otherwise connected to the charger 106). In some circumstances the rechargeable battery 102 is connected to the device 104 first, before both the device 104 and rechargeable battery 102 are put (together) in a charger 106 to charge the rechargeable battery 102. Before being placed in the charger 106, the device 104 (via device master 146) can read the memory 128 and obtain battery information and data contained therein. That information can be used to, for example, set various operating voltage thresholds of the device 104 for operating with the battery 102. Information in the battery can also include electrical limits for charging the rechargeable battery 102 such as, for example, current and voltage limits for a charge regime applied by the charger 106. In some embodiments the memory 128 can include information that can allow the charger 106 to determine if the rechargeable battery 102 is an original equipment manufacturer (OEM) unit. OEM information can be used by the charger 106 to determine whether the charger 106 uses a regular charge regime or a more conservative charge regime. The charger 106 can use the more conservative charge regime, such as a trickle charger only regime when the rechargeable battery 102 is of an unknown construction as indicated by the lack of appropriate OEM information or other information indicating the rechargeable battery 102 is of a known construction.

Figure 5:
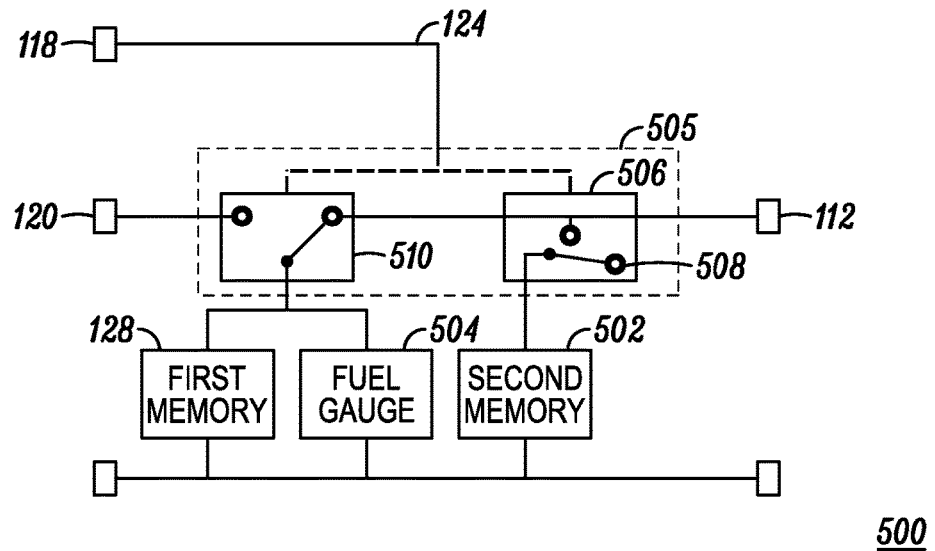
FIG. 5 is a block diagram of a rechargeable battery having alternately connected memory devices, in accordance with some embodiments.

FIG. 5 is a block diagram of a rechargeable battery 500 having alternately connected memory devices, in accordance with some embodiments. The basic structure of the rechargeable battery 102 in FIGS. 1-4 is shown here, including a device data contact 112, charger data contact 120, switch circuit 505 and line 124 over which a switch signal can be provided to the switch circuit 505, and memory 128, renamed here as first memory 128. Switch circuit 505 can operate similar to switch circuit 126 in FIGS. 1-4, but with the first and second switches 506, 510, respectively. In addition, a second memory 502 is included, and a fuel gauge 504 can be coupled to the first memory 128. The switch circuit 505, which in FIGS. 1-4 contained a single switch, now labeled as first switch 510, now comprises a second switch 506 for switching of the second memory 502. The switch signal on line 124 controls both switches 506, 510. The fuel gauge 504 measures charge through the battery cells, and can store charge data, the number of charge/discharge cycles, and other dynamic battery data. A charger (e.g., 106) or device (e.g., 104) can read static data and read or write dynamic data in the first memory 128. In addition to this dynamic battery data, the first memory 128 can contain static battery data as well. The static battery data is data that does not change, such as, for example, voltage limits based on battery chemistry. The second memory 502 contains, if not all, at least a subset of the static battery data stored in the first memory 128.

The switch circuit 505, in the absence of a switch signal on line 124, connects the first memory 128 and fuel gauge 504 to the device data contact 112 using first switch 510. Switch 508, in the absence of a switch signal, connects the second memory 502 to a null 508 (i.e. disconnected). Thus, when the rechargeable battery is connected only to a device (e.g. device 104), the device can access the first memory 128, including both the static and dynamic battery data. In some embodiments the device can write data to the first memory 128.

Figure 6:
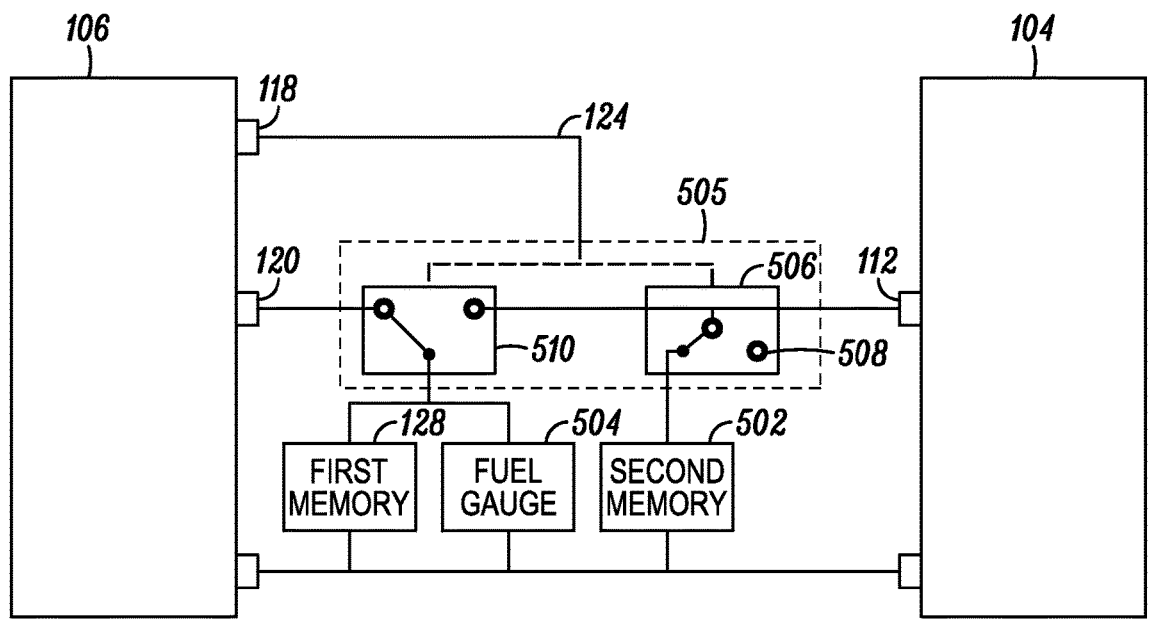
FIG. 6 is a block diagram of a rechargeable battery having alternately connected memory devices where the rechargeable battery is connected to both a charger and a device, in accordance with some embodiments.

FIG. 6 is a block diagram of a rechargeable battery system 600 having alternately connected memory devices where the rechargeable battery is connected to both a charger 106 and a device 104, in accordance with some embodiments. Although both charger 106 and device 104 are shown, the effect on the switching circuit 505 is the same as if the rechargeable battery were only connected to the charger 106. Since the charger 106 provides a switch signal on line 124 to the switch circuit 505, the switches 506, 510 change switch states. Switch 510 connects first memory 128 to the charger data contact 118, thereby disconnecting it from device data contact 112. Switch 506 connects the second memory 502 to the device data contact 112, thus giving the device 104 access to at least the static battery data in the second memory 502. In some embodiments the second memory 502 can be a read only memory (ROM), having the static battery data coded in it at, or prior to the time of manufacture of the rechargeable battery. Thus, the switch signal causes the switch circuit to switch the first memory from the device data contact 112 to the charger data contact 120, and the second memory from the null 508 to the device data contact 112, respectively. While so configured, the charger 106 can charge the rechargeable battery using information that can be read from the first memory 128, which can include, in some embodiments, the dynamic battery data provided by the fuel gauge 504.

Figure 7:
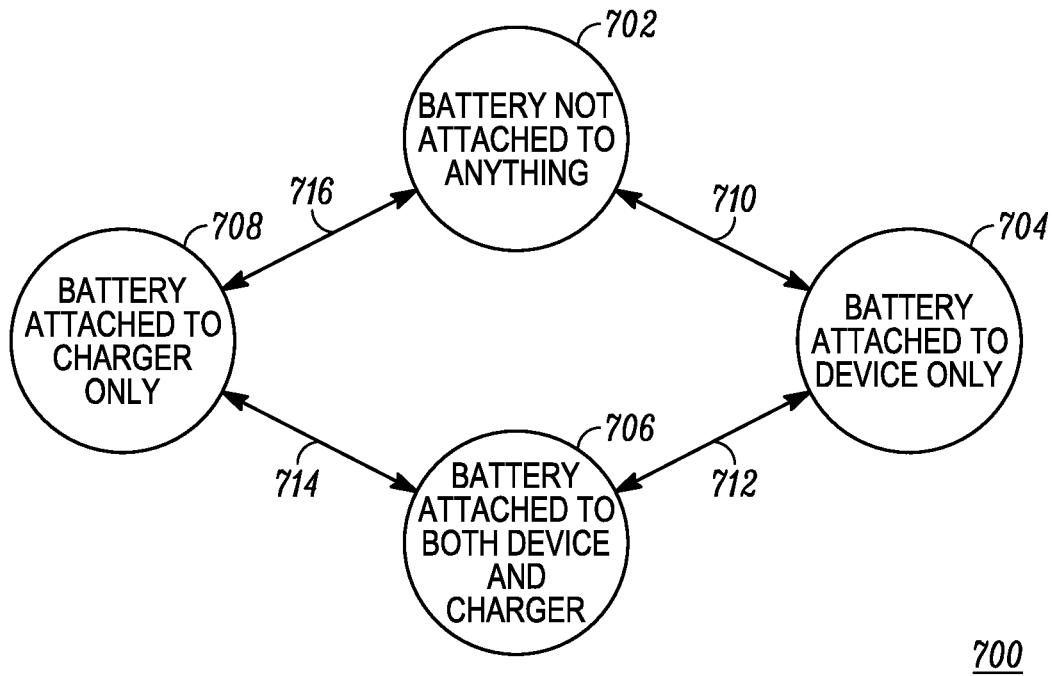
FIG. 7 is a state diagram of a rechargeable battery system, in accordance with some embodiments.

FIG. 7 is a state diagram 700 of a rechargeable battery system, in accordance with some embodiments. The state diagram 700 shows four battery states, which are states of connectedness to other things, such as a charger and a device powered by the rechargeable battery. State 702 represents a state where the rechargeable battery is not connected to any device or charger. State 704 represents a state where the rechargeable battery is connected to a device only, and not also a charger. State 706 represents a state where the rechargeable battery is connected to both a device and a charger. State 708 represents a state where the rechargeable battery is connected to only a charger, and not also a device. Connecting or disconnecting the device and/or charger cause transitions between the various states. Transition 710, between states 702, 704 is caused by connecting or disconnecting the device to or from, respectively, the rechargeable battery. Transition 712 between states 704, 706 is caused by connecting or disconnecting a rechargeable battery that is already connected to device powered by the rechargeable battery to or from, respectively, a charger. Transition 714 between states 706, 708, is caused by connecting or disconnecting a rechargeable battery that is already in a charger to or from, respectively, a device powered by the rechargeable battery. Transition 716 between states 702, 708 is caused by connecting or disconnecting the rechargeable battery to or from, respectively, a charger. In states 702, 704, the switch circuit of the rechargeable battery connects the memory, in single memory embodiments, or the first memory in dual memory embodiments, to the device data contact of the set of device contacts of the rechargeable battery. In dual memory embodiments in states 702, 704 the second memory is disconnected (i.e. connected to a null). In states 706, 708, since the charger provides a switch signal, the switch circuit of the rechargeable battery connects the memory, in single memory embodiments, or the first memory in dual memory embodiments, to the charger data contact of the set of charger contacts of the rechargeable battery. In dual memory embodiments in states 706, 708 the second memory is connected to the device data contact so that it can be read by the device.

The state diagram 700 illustrates a method of controlling access by multiple masters to memory devices in a rechargeable battery. For example, such a method can include receiving a switch signal at switch circuit from at least one contact of a set of charger contacts. The method can further include, when the switch signal is received at the set of charger contacts, the switch circuit switching the first memory to a charger data contact of the set of charger contacts, and switching the second memory to the device data contact.

Figure 8:
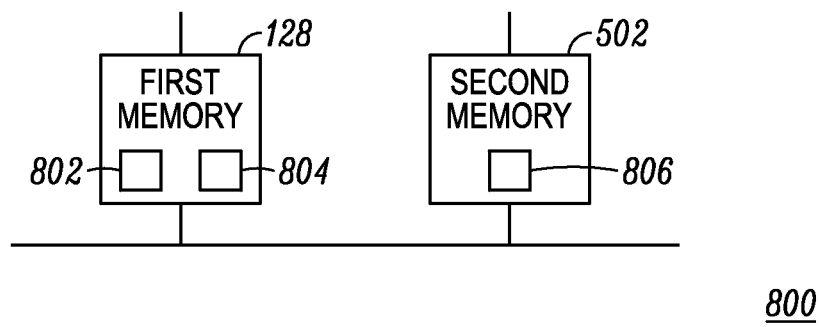
FIG. 8 is a block diagram of memory devices in a rechargeable battery and their contents, in accordance with some embodiments.

FIG. 8 is a block diagram 800 of memory devices in a rechargeable battery and their contents, in accordance with some embodiments. The diagram 800 shows the first and second memories 128, 502, respectively, of, for example, the rechargeable battery of FIGS. 5 & 6. In some embodiments the first memory 128 can be a writeable memory, such as, for example, a flash memory, and the second memory 502 can be only a readable memory such as a ROM. Both the first and second memories 128, 502, in addition to containing data memory, include circuitry to facilitate single wire communication, and circuitry for memory management and access. The first memory can contain both dynamic battery data 802, as well as static battery 804. The dynamic battery data can include, for example, present state of charge data, cycle life data, service life data, present capacity data, and any other battery-relevant data that can change over time. The static battery data can include, for example, operating voltage limits for the device such as a shutdown voltage threshold and a power up threshold, voltage limits to be used in charging the battery, an indication of battery chemistry type, and other battery data that does not change, or changes insignificantly, over time. The second memory 502 can contain static battery data 806 that is at least a subset, if not all, of the static battery data 804 in the first memory 128. Thus, when the device is connected to a rechargeable battery according to the various embodiments that is also connected to a charger, it can access at least the data 806 in the second memory and allow the device to operate appropriately using, for example, low voltage and power up voltage thresholds that allow maximum use of the capacity of the rechargeable battery.

Thus, the embodiments provide the benefit of preventing both masters in the charger and the device from having simultaneous access to a single memory in the rechargeable battery. The switching arrangement used alleviates communications or electrical conflicts that may exist when both charger and device masters are simultaneously connected to battery memory devices. Communications conflicts will occur when one or both masters lack the necessary functionality to coordinate communications control. Electrical conflicts will occur when the charger and device electrically power the data line from two different voltages. Hence, break-before-make switches are used. Defaulting the switch or switches to connect battery memory devices to the device data contact ensures device access when not in a charger.

Using the disclosed switch arrangement, with appropriate low-leakage switches, Galvanic action at the charger data contact can be substantially avoided when the battery is attached to a device and subject to moisture sufficient to otherwise cause Galvanic action.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A rechargeable battery pack, comprising:
a set of charger contacts that interface with a battery charger to facilitate recharging of the rechargeable battery pack, and including a charger data contact;
a set of device contacts that interface with a device and to power the device, and including a device data contact;
a first memory that is writeable, and which also contains static battery data, wherein the device and battery charger lack functionality to coordinate communications control with the first memory; and
a switch circuit that alternately connects the first memory to either the charger data contact or the device data contact based on a state of a switch signal provided to the switch circuit, the switch circuit thereby preventing the device and charger from accessing the first memory at the same time, the switch circuit thereby alleviating communication conflicts and electrical conflicts that occur in response to the battery charger and the device being simultaneously connected to the first memory of the rechargeable battery pack.

2. The rechargeable battery pack of claim 1, further comprising: a second memory that contains a copy of at least a subset of the static battery data, wherein the switch circuit switches the second memory to the device data contact when the switch circuit connects the first memory to the charger data contact, and switches the second memory to a null when the switch circuit connects the first memory to the device data contact.

3. The rechargeable battery pack of claim 2, wherein the switch signal is provided by the charger at a contact of the set of charging contacts, wherein without the switch signal the first memory is connected to the device data contact and the second memory is connected to the null, and upon the switch signal being applied the switch circuit connects the first memory to the charger data contact and the second memory to the device data contact.

4. The rechargeable battery pack of claim 3, wherein the switch signal is provided by the charger through a thermistor contact of the set of charger contacts.

5. The rechargeable battery pack of claim 2, wherein the second memory is a read only memory.

6. The rechargeable battery pack of claim 2, wherein the first memory contains dynamic battery data.

7. The rechargeable battery pack of claim 6, further comprising a fuel gauge coupled in parallel with the first memory.

8. The rechargeable battery pack of claim 1, wherein the static battery data includes an indication of battery chemistry and total capacity.

9. A method of controlling access by multiple masters to memory devices in a rechargeable battery, comprising:
   providing a switch signal line to a switch circuit from at least one contact of a set of charger contacts the rechargeable battery, wherein a switch signal is provided to the switch circuit via the switch signal line when the rechargeable battery is connected to a charger at the set of charger contacts;
   when the rechargeable battery is only connected to a device at a set of device contacts, the switch circuit connecting a first memory of the rechargeable battery to a device data contact of the set of device contacts, and connecting a second memory to a null, wherein the first memory is writeable and contains both dynamic and static battery data, and wherein the second memory contains at least a subset of the static battery data, the switch circuit thereby preventing the device and charger from attempting to access the first memory at the same time via the switch circuit;
   when the rechargeable battery is connected to either only the charger at the set of charger contacts, or both the charger at the set of charger contacts and a device at the set of device contacts, responsive to receiving the switch signal from the charger the switch circuit connecting the first memory to a charger data contact of the set of charger contacts, and switching the second memory to the device data contact; and
   wherein the device and charger lack functionality to coordinate communications control with the first and second memories, the switch circuit thereby alleviating communication conflicts and electrical conflicts that occur in response to the charger and the device being simultaneously connected to the first and second memories of the rechargeable battery pack.

10. The method of claim 9, wherein receiving the switch signal comprises receiving the switch signal at a thermistor contact of the set of charger contacts.

11. The method of claim 9, wherein a fuel gauge is coupled in parallel to the first memory, the method further comprises;
   when the rechargeable battery is only connected to the device, the method further comprises the switch circuit connecting the fuel gauge to the device data contact and not the charger data contact; and
   when the rechargeable battery is connected to either the charger alone or both the charger and the device, the method further comprises the switch circuit connecting the fuel gauge to the charger data contact and not the device data contact.

12. The method of claim 9, wherein second memory is a read only memory.

13. The method of claim 9, wherein the static battery data includes an indication of battery chemistry and total capacity.

14. The method of claim 9, wherein connecting the first memory to the device data contact, connecting the second memory to the null, connecting the first memory to the charger data contact, and connecting the second memory to the device data contact are performed in a break-before-make switching action.

15. The method of claim 9, when rechargeable battery is connected only to the device and not the charger, the method further comprising:
   receiving a read signal at the first memory from the device data contact; and
   providing the dynamic battery data or the static battery data, or both, to the device data contact in response to the read signal.

16. The method of claim 9, when the rechargeable battery is connected to either the charger alone or both the charger and the device, the method further comprising:
   receiving a read signal at the first memory from the charger data contact; and
   providing the dynamic battery data or the static battery data, or both, to the charger data contact in response to the read signal.

17. A rechargeable battery system, comprising:
   a rechargeable battery having:
      a set of device contacts including a device data contact and a set of charger contacts including a charger data contact;
      a first memory and a second memory, wherein the first memory is a writable memory that contains both dynamic battery data and static battery data, the second memory containing at least a subset of the static battery data;
      a switch circuit that, switches the first memory to either the charger data contact or the device data contact, and switches the second memory to either the device data contact or a null, respectively, based on a state of a switch signal provided to the switch circuit, the switch circuit thereby preventing the device data contact and the charger data contact from accessing the first memory at the same time;
   a charger that, when connected to the rechargeable battery, provides the switch signal, causing the switch circuit of the rechargeable battery to switch the first memory to the charger data contact and the second memory to the device data contact;
   a device powered by the rechargeable battery that, when the rechargeable battery is not connected to the charger, accesses the first memory, and when the rechargeable battery is connected to the charger accesses the second memory; and
   wherein the device and charger lack functionality to coordinate communications control with the first and second memories, the switch circuit thereby alleviating communication conflicts and electrical conflicts that occur in response to the charger and the device being simultaneously connected to the first and second memories of the rechargeable battery pack.

18. The rechargeable battery system of claim 17, further comprising a fuel gauge circuit in the rechargeable battery that is connected to the first memory and writes dynamic battery data into the first memory.

19. The rechargeable battery system of claim 17, wherein the charger provides the switch signal via a thermistor contact of the set of charging contacts.

20. The rechargeable battery system of claim 17, wherein the static battery data includes at least a power up voltage threshold and a shutdown threshold for operating the device, wherein the power up threshold and shutdown threshold are based on a chemistry of one or more cells of the rechargeable battery.

21. The rechargeable battery pack of claim 1, wherein the device applies a voltage to the device data contact through a pull-up resistor to allow the device to read the memory.

22. The method of claim 7, wherein the device applies a voltage to the device data contact through a pull-up resistor to allow the device to read the memory.

23. The rechargeable battery system of claim 17, wherein the device applies a voltage to the device data contact through a pull-up resistor to allow the device to read the memory.

24. The rechargeable battery pack of claim 21, wherein the first memory, once voltage is applied thereto, is writeable to using a single wire communication protocol.

25. The method of claim 22, wherein the first memory, once voltage is applied thereto, is writeable to using a single wire communication protocol.

26. The rechargeable battery system of claim 23, wherein the first memory, once voltage is applied thereto, is writeable to using a single wire communication protocol.

27. The rechargeable battery pack of claim 21, wherein the switch signal provided to the switch circuit is provided through a thermistor input of the battery.

28. The method of claim 22, wherein the switch signal provided to the switch circuit is provided through a thermistor input of the battery.

29. The rechargeable battery system of claim 23, wherein the switch signal provided to the switch circuit is provided through a thermistor input of the battery.

30. The rechargeable battery pack of claim 1, wherein when the rechargeable battery is connected to the device but not the charger, the switch circuit disconnects the charger data contact from the device data contact, thereby preventing the presence of voltage at the charger data contact and avoiding galvanic corrosion at the charger data contact.

31. The method of claim 14, wherein when the rechargeable battery is connected to the device but not the charger, the switch circuit disconnects the charger data contact from the device data contact, thereby preventing the presence of voltage at the charger data contact and avoiding galvanic corrosion at the charger data contact.

32. The rechargeable battery system of claim 17, wherein when the rechargeable battery is connected to the device but not the charger, the switch circuit disconnects the charger data contact from the device data contact, thereby preventing the presence of voltage at the charger data contact and avoiding galvanic corrosion at the charger data contact.

* * * * *